INVENTORS
GEORGE A. KENT
RICHARD J. WARING
BY PENDLETON, NEUMAN
SEIBOLD & WILLIAMS
ATTORNEYS

INVENTORS
GEORGE A. KENT
RICHARD J. WARING
BY PENDLETON, NEUMAN
SEIBOLD & WILLIAMS
ATTORNEYS 3,408,534

PROTECTIVE VOLTAGE SUPPLY CIRCUIT

George A. Kent, Fort Wayne, and Richard J. Waring, Auburn, Ind., assignors to The Magnavox Company, Fort Wayne, Ind., a corporation of Delaware Filed Oct. 25, 1966, Ser. No. 589,284
10 Claims. (Cl. 315—22)

Figure 1:
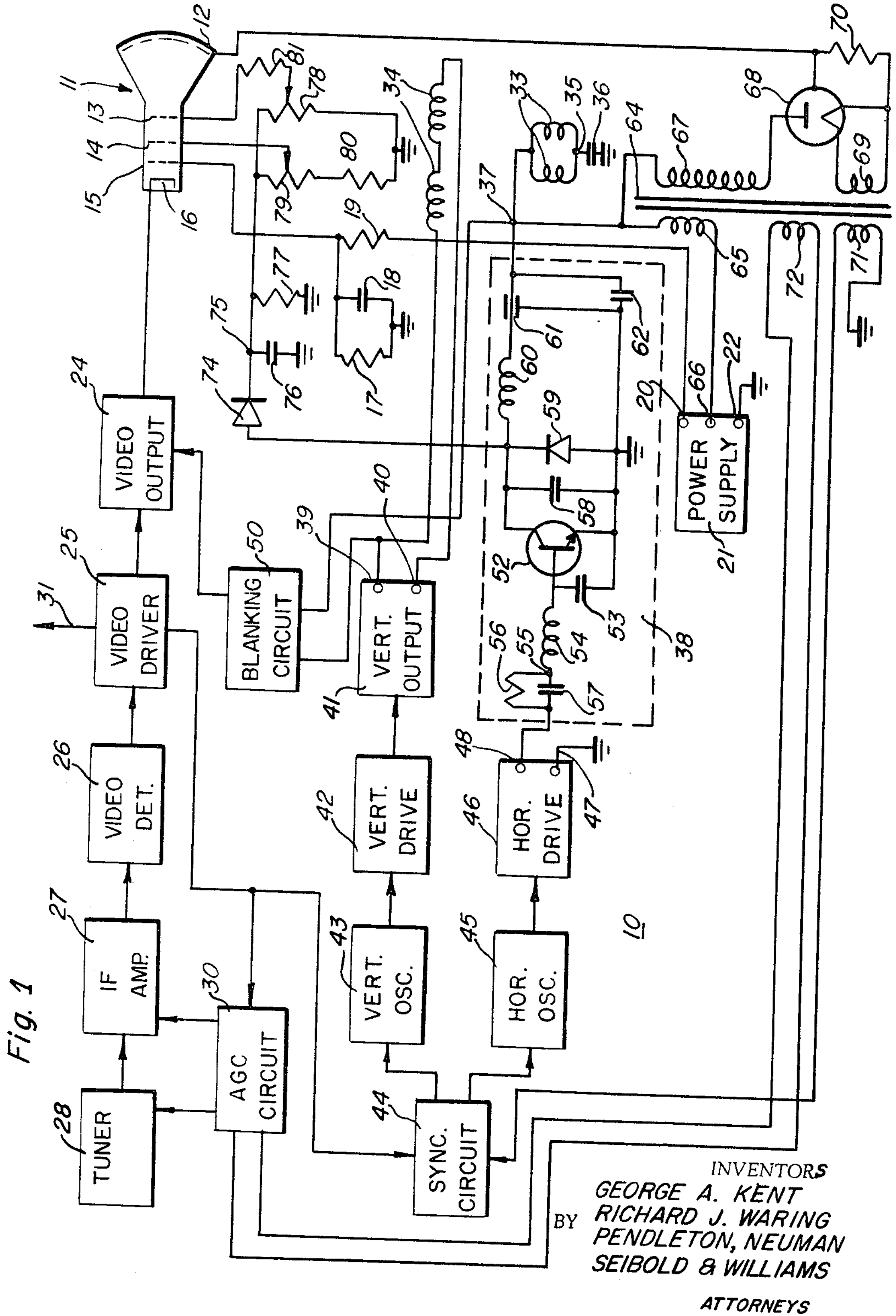

This invention relates to a voltage supply circuit for large screen solid state television receivers and more particularly to a voltage supply circuit of a type wherein a DC voltage is produced by rectifying and filtering high voltage flyback pulses produced across an inductor winding. The circuit of this invention is highly advantageous in protecting against high voltage transients across a current control device in circuit with the inductor winding, while providing the necessary filtering of the DC voltage. The circuit is especially useful in receivers requiring 17 to 21 kilovolts of high voltage and using a vacuum tube for the high voltage rectifier. The circuit uses a minimum number of component parts, is readily and economically manufacturable, and is highly efficient and reliable.

Although having other applications, the circuits of this invention was designed for and is particularly advantageous in a television receiver or the like, wherein a high voltage for application to the screen of a picture tube is developed by rectifying high voltage pulses developed across a secondary winding of a transformer having a primary winding coupled to a horizontal output stage with deflection coils being coupled in parallel relation to the primary winding, through a capacitor. In such systems, the current through the primary winding and the deflection coils is gradually built up during each cycle of a horizontal sweep signal and is then abruptly cut off during a retrace time interval to develop a high amplitude voltage pulse across the secondary winding, during collapse of the magnetic field of the deflection coils. To develop the proper wave shape of current in the deflection coils, a damper diode is usually connected in generally parallel relation to the current control device to conduct current in a direction reverse to that conducted through the current control device.

In a number of such systems, a voltage is developed for application to the focusing and accelerating electrodes of the electron gun structure of the picture tube, by rectifying the voltage developed across the primary winding and applying the rectified voltage to a resistance-capacitance filter network.

In such systems, problems have arisen because of voltage transience across the current control device. In the past, satisfactory operation has been obtained by using a vacuum tube of a type capable of withstanding high voltage transients, or using special types of transistors. However, failures of both the vacuum tube and the transistors has been common, and the use of transistors has been restricted to portable television receivers having small picture tubes and having low power requirements.

This invention was evolved with the general object of providing an improved voltage supply circuit, overcoming the disadvantages of prior art circuits, and having means for protecting a current control device against high voltage transience.

A more specific object of the invention is to provide a voltage supply circuit operative from a transistorized horizontal output stage and operative to supply voltages at relatively high power levels to a large size picture tube.

A further object of the invention is to provide a voltage supply circuit using a minimum number of component parts and being readily and economically manufacturable while being highly reliable and efficient in operation.

According to this invention a rectifier diode and a capacitor are connected directly between electrodes of a current control device and the product of the capacitance of the capacitor and the effective resistance of load means in parallel with the capacitor is at least several times greater than the duration of one cycle of a control signal applied to the current control device, the current control device being connected in series with an inductor winding. With this extremely simple arrangement, the voltage between the current control device electrodes is clamped to a substantially constant value during each flyback time interval of a control signal applied to the current control device. As a result, voltage transients or "spikes" cannot be developed across the current control device and failures of the device are obviated.

The circuit can be used to advantage with a vacuum tube as the current control device but is particularly advantageous when a transistor is used as the current control device in that transistors generally are more subject to failure due to excessive voltage transients, especially when the power level of operation is relatively high.

According to a further specific feature of the invention, the circuit is incorporated in a television system wherein the current control device is in the horizontal output stage and wherein the inductor means is in the form of a transformer having a primary winding connected in series with the curret control device and having a secondary winding connected to a high voltage rectifier for supplying high voltage to the screen of a picture tube. In this arrangement, the voltage developed across the capacitor in series with the rectifier diode can be used as the supply for operating voltages applied to focusing and accelerating grids of the electron gun structure of the picture tube. A particular advantage of this arrangement is that the voltage developed across the capacitor can be applied without additional filtering, due to the fact that the product of the capacitance of the capacitor and the effective resistance of the load thereon is at least several times greater than the duration of one cycle of the horizontal deflection signal. Thus, the number of components is minimized while obtaining a high degree of protection on the control device of the horizontal output stage.

Figure 2:
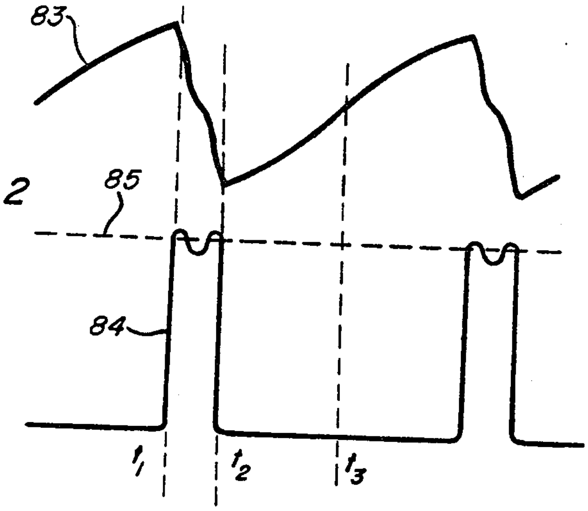

This invention contemplates other and more specific objects, features and advantages which will become more fully apparent from the following detailed description taken in conjunction with the accompanying drawings which illustrate a preferred embodiment and in which:

FIGURE 1 is a schematic diagram illustrating a television receiver constructed according to the principles of this invention and showing in detail the circuits of horizontal output and voltage supply stages, other circuits of the receiver being shown in block form; and FIGURE 2 is a diagram showing current and voltage wave forms for explanation of the operation of the horizontal output and voltage supply stages of the receiver of FIGURE 1.

Reference numeral 10 generally designates a television receiver constructed in accordance with the principles of this invention. In general, the receiver 10 comprises a picture tube 11 having a screen 12 and having a conventional electron gun structure for producing an electron beam to be impinged on the screen 12, including a focusing grid 13, an accelerating grid 14, a control grid 15 and a cathode 16. The screen 12, focusing grid 13 and accelerating grid 14 are connected to voltage supplying circuits described in detail hereinafter, while the control grid 15 is connected through a resistor 17 and a capacitor 18 to ground and through a resistor 19 to a terminal 20 of a power supply 21 having a terminal 22 connected to ground.

The cathode 16 is connected to the output of a video output stage 24 which receives a video signal from a video driver stage 25, supplied with a video signal from a video detector stage 26. The detector stage 26 is supplied with a signal from an IF amplifier 27 which receives a signal from a conventional tuner 28. An automatic gain control circuit 30 may be provided, which receives a signal from the video driver stage 25 and which applies gain control signals to the IF amplifier 27 and to the tuner 28. The video driver stage 25 may additionally apply a signal through a line 31 to a sound IF stage, coupled through suitable detector and amplifier circuits to a speaker for reproducing the audio portion of a received signal.

To effect deflection of the beam of the picture tube 11, a pair of horizontal deflection coils 33 and a pair of vertical deflection coils 34 are provided. The horizontal deflection coils 33 are connected in parallel between a circuit point 35 which is connected through a capacitor 36 to ground and a circuit point 37 which is connected to the output of a horizontal output stage 38, described in detail hereinafter.

The vertical deflection coils 34 are connected in series between a pair of output terminals 39 and 40 of a vertical output stage 41 which is supplied with a signal from a vertical drive stage 42. The vertical drive stage 42 is supplied with a signal from a vertical oscillator stage 43 to which a synchronizing signal is applied from a synchronizing circuit 44, supplied with a signal from the video driver stage 25. The synchronizing circuit 44 also applies synchronizing signals to a horizontal oscillator stage 45 which applies a signal to a horizontal drive stage 46 having an output terminal 47 connected to ground and a second output terminal 48 connected to the horizontal output stage 38.

A blanking signal coupling circuit 50 may be provided having inputs connected to the circuit point 37 which is connected to the output of the horizontal output stage 38 and connected to the output terminal 39 of the vertical output stage 41, the output of the coupling circuit 50 being applied to the video output stage 24, to effect blanking during horizontal and vertical retrace time intervals.

The horizontal output stage 38 comprises a transistor 52 having a base electrode connected through a capacitor 53 to ground and connected through an inductor 54 to a circuit point 55 which is connected through a resistor 56 and a capacitor 57 to the output terminal 48 of the horizontal drive stage 46.

The emitter of the transistor 52 is connected to ground while the collector thereof is connected through a capacitor 58 and through a damper diode 59 to ground. The collector of the transistor 52 is additionally connected through an inductor 60 to the circuit point 37, the lead wire between inductor 60 and circuit point 37 being coupled to ground through a capacitor 61 and the circuit point 37 being additionally connected through a capacitor 62 to ground.

To supply a high voltage to the screen 12 of the picture tube 11, a transformer 64 is provided having a primary winding 65 connected between the circuit point 37 and an output terminal 66 of the power supply 21. The transformer 64 has a secondary winding 67 connected between circuit point 37 and the anode of a high voltage rectifier 68 having a directly heated cathode which is connected to a winding 69 of the transformer 64 and which is connected through a resistor 70 to the screen 12 of the picture tube 11. Additional windings 71 and 72 may be provided on the transformer 64, winding 71 being connected between ground and a line which is connected to the synchronizing circuit 44, and winding 72 being connected to terminals of the automatic gain control circuit 30, the windings 71 and 72 being effective to supply signals to such circuits during horizontal retrace time intervals.

In the operation of the circuit as thus far described, a generally rectangular wave form is applied to the base electrode of the transistor 52 from the output terminal 48 of the horizontal drive stage 46, to render the transistor 52 conductive. The current through the primary 65 of the transformer 64 then increases and current through the horizontal deflection coils 33 also increases to move the spot on the face of the screen of the picture tube 11 from a near the center of the screen to the right side of the screen. At this time, the transistor 52 is rendered non-conductive by a negative voltage on the base electrode thereof. A rapid change in the flux in the core of the transformer 64 then occurs, to induce high reactive voltages in the windings thereof. The voltage developed across the winding 67 is rectified by the rectifier 68 to produce a high voltage at the cathode thereof which is applied through the resistor 70 to the screen 12 of the picture tube 11. The voltage produced across the winding 65 is applied to the horizontal deflection coils 33 to reduce the current therethrough and to then produce current in a reverse direction therethrough, so as to move the spot on the face of the screen of the picture tube 11 to the left side of the screen.

During the time interval following the rendering of the transistor 52 non-conductive, which is referred to as the flyback time interval, a ringing or oscillatory action occurs, from the inductance of the yoke winding 33 and from capacitances 62 in the circuit including the distributed capacitance of the winding 65. The ringing or oscillatory action tends to cause the potential of the collector of the transistor 52 to move in a negative direction relative to ground, at which time the damper diode 59 becomes forward biased. Inductive energy from the yoke can then discharge through the coils 33 and the diode 59 to produce a linear change in the current through the coils 33 and to cause the spot on the face of the screen of the picture tube 11 to move from the left side of the screen to the center. With the transistor 52 being then forward biased by a signal from the horizontal drive stage 46, the operation is repeated as described above.

The capacitor 36 also serves to block DC current through the coils 33 and to provide "S" shaping of the current wave form, to compensate for stretching at the left and right sides of the picture which might otherwise occur due to the nature of magnetic deflection, and the fact that the curvature of the picture tube face and the deflected beam do not describe the same arc.

In accordance with this invention, a circuit is provided which develops a relatively high voltage for application to the focusing and accelerating grids 13 and 14 of the picture tube 11 and which includes components so connected and having values such as to prevent application of voltage spikes or surges to the transistor 52, and so as to stabilize the operation of the horizontal output stage 38.

In particular, the collector of the transistor 52 is connected through a rectifier diode 74 to a circuit point 75 which is connected through a capacitor 76 to ground, the diode 74 and the capacitor 76 being thereby connected in series directly between the collector and emitter of the transistor 52. The circuit point 75 is additionally connected through a loading resistor 77 to ground and to end terminals of a pair of potentiometers 78 and 79. The opposite end terminal of potentiometer 78 is connected directly to ground while the opposite end terminal of potentiometer 79 is connected through a resistor 80 to ground. The adjustable contact of potentiometer 78 is connected through a resistor 81 to the focusing grid 13, while the adjustable contact of potentiometer 79 is connected directly to the accelerating grid 14. The current paths within the electron gun structure of the picture tube 11, from the grids 13 and 14 to the cathode 16, together with the potentiometers 78 and 79 and the resistors 80, 81 and 77, form a load means connected across the capacitor 76. In accordance with this invention, the effective resistance of such load means, multiplied by the capacitance of the capacitor 76, is at least several times greater than the duration of one cycle of the horizontal deflection signal applied to the base electrode of the transistor 52. With this feature, the voltage between the collector and emitter electrodes of the transistor 52 is clamped to a substantially constant value during flyback time intervals, the diode 74 and the capacitor 76 being connected in series directly between the collector and emitter electrodes of the transistor 52, as above noted. This arrangement also serves to supply DC voltages to the grids 13 and 14 of the picture tube 11 at levels which are substantially uniform without requiring additional filtering capacitors or decoupling resistors.

Preferably the product of the capacitance of the capacitor 76 and the effective resistance of the load means connected thereto is at least 50 times greater than the duration of one cycle of the control signal. By way of example, the capacitor 76 may have a capacitance of 0.22 microfarad while the resistor 77 may have a resistance of 200,000 ohms. The resistance of the potentiometer 78 may be 2.5 megohms, the resistance of the potentiometer 79 may be 10 megohms, the resistance of resistor 80 may be 15 megohms and the resistance of the resistor 81 may be 1 megohm. A minimum loading effect is thereby produced by the potentiometers 78 and 79, together with resistors 80 and 81 and the current paths from the grids 13 and 14 to the cathode 16, so that the effective load resistance presented as a discharge path for the capacitor 76 is only slightly less than the resistance of the resistor 77 which may be on the order of 200,000 ohms. As a result, the product of the capacitance of the capacitor 76 and the effective resistance of the load means connected thereto is on the order of 40,000 micro seconds with the above values, as compared with a cycle duration of 63.5 micro seconds, obtained with a horizontal deflection signal at the standard frequency of 15,750 cycles per second. Thus, the product of the capacitance of the capacitor 76 and the effective resistance of the load means connected thereto is on the order of 600 times greater than the duration of one cycle, with the values indicated above.

Referring now to FIGURE 2, reference numeral 83 indicates the wave form of current through the deflection coils 33, while reference numeral 84 indicates the wave form of voltage at the collector of the transistor 52. As shown, the current through the coils 33 increases up until time $T_1$, at which time a negative signal is applied to the base electrode of the transistor 52 to render the transistor 52 non-conductive. Up until time $t_1$, the collector of the transistor 52 is at a relatively low positive potential. When the transistor 52 is rendered non-conductive at time $t_1$, the magnetic field in the deflection coils 33 changes rapidly to induce a relatively large voltage across the winding and to cause the current therein to be rapidly reduced and to cause the potential of the collector of the transistor 52 to become highly positive. At this time, the capacitor 76 may be charged to a certain value such that the circuit point 75 is at a voltage level as indicated by dotted line 85 in FIGURE 2. When the potential of the collector of the transistor 52 exceeds the potential of the circuit point 75, the diode 74 becomes conductive to limit the rise of the potential of the collector of the transistor 52, and to place an additional charge on the capacitor 76.

Due to the above-described ringing or oscillatory action, the current in the deflection coils 33 is reduced to zero and then moves in a negative direction. As the current passes through zero, the potential of the collector of the transistor 52 may move somewhat below the level of 85 of the circuit point 75, but as the current is increased in a negative direction, the potential of the collector may again rise above the level 85, to again cause conduction of the diode 74 and to increase the charge of capacitor 76, the voltage of the collector of the transistor 52 being again limited to a value only slightly above the level 85. When the deflection coil current reaches a maximum negative value, at a time $t_2$, the yoke (33) changes capacitor 36 to a certain value to cause the current therethrough to move toward zero at a time $t_3$, after which the abovedescribed cycle is repeated.

The circuit including the rectifier diode 74, the capacitor 76 and the load means connected to the capacitor thus functions to limit the voltage between the collector and the emitter electrodes of the transistor 52 to a value only slightly greater than the level of charge of the capacitor 76, as indicated by dotted line 85 in FIGURE 2. This level is determined by the value of the load connected across the capacitor 76 and by the energy available for charging of the capacitor 76 during each flyback time interval from $t_1$ to $t_2$. By way of example, the circuit values may be such that the circuit point 75 is at a positive potential of 500 volts relative to ground, which is suitable for applying operating potentials to the focusing and accelerating electrodes of large size picture tubes, such as types 23MP4, 24AHP4 and 27ZP4, by way of example. The power supply 21 may supply a positive potential of 68 volts at the terminal 66, while the transistor 52 may be a conventional type. With the voltage between the collector and emitter electrodes being limited to a value only slightly greater than 500 volts, this type of transistor can operate indefinitely without failure, while supplying sufficient power to the horizontal deflection coils 33 and while supplying sufficient power for application of a screen voltage of on the order of 18 kilovolts to a large size picture tube, such as one of the types indicated above.

With regard to the values of other components of the circuit, the capacitor 58 may have a capacitance of 1,000 picofarads, the capacitor 61 may have a capacitance of 1,000 picofarads and the capacitor 62 may have a capacitance of 8,200 picofarads.

It will be understood that modifications and variations may be effected without departing from the spirit and scope of the novel concepts of this invention.

We claim as our invention:

1. In an electronic circuit, voltage supply means comprising: inductor means including a winding having a pair of terminals, a DC power supply having a pair of terminals, means connecting one terminal of said winding to one terminal of said power supply, a current control device having a pair of electrodes, and a control electrode for controlling conduction between said pair of electrodes, means connecting said pair of electrodes to the other terminals of said power supply and said winding, means for cyclically applying a control signal to said control electrode to build up current through said winding and to then operate for a short flyback interval to abruptly cut off current through said winding and to induce a relatively large voltage thereacross, a rectifier diode, a capacitor, means connecting said rectifier diode and said capacitor in series directly between said pair of electrodes of said current control device, and load means connected across said capacitor, the product of the capacitance of said capacitor and the effective resistance of said load means being at least several times greater than the duration of one cycle of said control signal, whereby the voltage between said pair of current control device electrodes is clamped to a substantially constant value during said flyback time interval.

2. In an electronic circuit as defined in claim 1, the product of the capacitance of said capacitor and the effective resistance of said load means being at least fifty times greater than the duration of one cycle of said control signal.

3. In an electronic circuit as defined in claim 1, said current control device being a power transistor having emitter and collector electrodes constituting said pair of electrodes and having a base electrode constituting said control electrode.

4. In an electronic circuit as defined in claim 1, a damper diode connected between said pair of electrodes of said current control device and arranged to conduct during said flyback interval to dissipate any remaining energy not applied to said capacitor and said load means.

5. In an electronic circuit as defined in claim 1, the voltage between said DC power supply terminals being on the order of 70 volts and the voltage applied to said load means being on the order of 500 volts.

6. In an electronic circuit as defined in claim 1, a television picture tube having a screen and an electron gun structure including an accelerating electrode, said inductor means being in the form of a transformer having a primary winding constituting said winding connected to said current control device and having a secondary winding, high voltage rectifier means connected to said secondary winding for applying high voltage to said picture tube screen, and means forming part of said load means and coupled to said accelerating electrode to supply operating voltage thereto.

7. In an electronic circuit as defined in claim 6, said screen being operated at a potential on the order of 18,000 volts and said accelerating electrode being operated at a potential on the order of 500 volts.

8. In an electronic circuit as defined in claim 6, deflection means for said picture tube including horizontal deflection coil means, and means coupling said deflection coil means across said primary winding.

9. In a television receiver including a picture tube having a screen and an electron gun structure including an accelerating electrode, deflection coils for said picture tube including horizontal deflection coil means, a transformer having primary and secondary winding means, a DC power supply having a pair of terminals, means connecting one terminal of said primary winding means to one terminal of said power supply, a transistor having base, emitter and collector electrodes, means connecting said emitter and collector electrodes to the other terminal of said power supply and to another terminal of said primary winding means, means for applying a horizontal deflection signal to said base electrode to build up current through said primary winding means and to then operate for a short flyback interval to abruptly cut off current through said primary winding means and to induce relatively large voltages across said primary winding means and across said secondary winding means, high voltage rectifier means connected to said secondary winding means for applying a high voltage to said picture tube screen, a rectifier diode, a capacitor, means connecting said rectifier diode and said capacitor in series directly between said emitter and collector electrodes, and load means connected to said accelerating electrode and connected across said capacitor, the product of the capacitance of said capacitor and the effective resistance of said load means being at least several times greater than the duration of one cycle of the horizontal deflection signal.

10. In a television receiver as defined in claim 9, said capacitance being on the order of 0.22 microfarad and said effective resistance of said load means being on the order of 200,000 ohms.

References Cited

UNITED STATES PATENTS

| | | | |
|---|---|---|---|
| 2,843,796 | 7/1958 | Schade | 315—22 |
| 3,113,237 | 12/1963 | Schopp et al. | 315—31 |
| 3,122,674 | 2/1964 | Buechel | 315—27 |
| 3,177,396 | 4/1965 | Brooks | 315—22 X |

RODNEY D. BENNETT, *Primary Examiner.*

H. C. WAMSLEY, *Assistant Examiner.*